United States Patent [19]

Nakajima

[11] Patent Number: 5,231,575
[45] Date of Patent: Jul. 27, 1993

[54] IMAGE READ-OUT APPARATUS

[75] Inventor: Nobuyoshi Nakajima, Kanagawa, Japan

[73] Assignee: Fuji Photo Film Co., Ltd., Kanagawa, Japan

[21] Appl. No.: 600,935

[22] Filed: Oct. 22, 1990

[30] Foreign Application Priority Data

Oct. 20, 1989 [JP] Japan .................................. 1-272943
Feb. 7, 1990 [JP] Japan .................................. 2-28001

[51] Int. Cl.⁵ ...................... G06F 15/00; G03G 5/16
[52] U.S. Cl. ........................... 364/413.13; 250/327.2; 250/484.1
[58] Field of Search ............... 364/413.13; 250/327.2, 250/484.1, 327.2 D–327.2 G; 358/474, 75, 80, 448, 447, 481, 484.1, 487, 76, 282–284; 382/50, 61

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/337 |
| 4,315,318 | 2/1982 | Kato et al. | 364/515 |
| 4,387,428 | 6/1983 | Ishida et al. | 250/337 |
| 4,816,676 | 3/1989 | Agano | 250/327.2 |
| 4,992,664 | 2/1991 | Shimura et al. | 250/327.2 |

FOREIGN PATENT DOCUMENTS 56-11395 2/1981 Japan .
61-5193 2/1986 Japan .

Primary Examiner—Roy N. Envall, Jr.
Assistant Examiner—Frantzy Poinvil
Attorney, Agent, or Firm—Sughrue, Mion, Zinn, Macpeak & Seas

[57] ABSTRACT

An image read-out apparatus comprises a readout section for scanning a recording medium, on which an image has been recorded, in a main scanning direction and a sub-scanning direction, and thereby generating an image signal which has been sampled with a predetermined sampling density from the image, and an input section from which information about the type of the image and a high-density sampling instructing signal can be entered. The read-out section is provided with a sampling density adjusting device, which adjusts the predetermined sampling density so that it becomes equal to a sampling density corresponding to the type of the image in cases where only the information about the type of the image has been entered from the input section, and which adjusts the predetermined sampling density so that it becomes equal to a high sampling density, which is higher than the sampling density corresponding to the type of the image, in cases where the high-density sampling instructing signal has been entered from the input section.

43 Claims, 2 Drawing Sheets

IMAGE READ-OUT APPARATUS

BACKGROUND OF THE INVENTION

1. Field of the Invention

This invention relates to an image read-out apparatus wherein a recording medium, such as X-ray film or a stimulable phosphor sheet, on which an image has been recorded, is scanned in a main scanning direction and a sub-scanning direction, and an image signal representing the image is thereby obtained.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal (image signal) to be used in the reproduction of a visible image on a recording material, such as photographic film, or on a display device, such as a CRT display device.

In the radiation image recording and reproducing systems described above, different sampling densities should be employed during the detection of image signals representing different types of images. Usually, the type of an image is designated, and an image signal is detected from the image with a sampling density suitable for the designated type of the image. By way of example, images are classified into types in accordance with what mode was used when the image was recorded (e.g., an ordinary image recording mode, an enlarged image recording mode, or tomography) and what portion of an object is represented by the recorded image (e.g., the head, the neck, the chest, or the abdomen in cases where the object is a human body).

However, even for images of the same type (e.g. a plurality of images which represent the same portion of an object and which are recorded in the same mode), the necessary sampling density varies in accordance with from what point of view a person aims at observing a visible image reproduced from the image signal. If a sampling density different from the necessary sampling density is employed, the problem often occurs in that the details of an image, which should be found, cannot be found. For example, an X-ray image of the chest of a human body is usually used during diagnosis of a tuberculosis or a cancer of the lungs. Therefore, when the type "ordinary image recording mode, frontal chest" is selected during the image read-out operation, an image signal is obtained with a sampling density suitable for making a diagnosis of an ordinary disease, such as a tuberculosis or a cancer of the lungs. However, it often occurs that an interstitial disease occurring between alveoli of the lung should be diagnosed. In such cases, the problem occurs in that details cannot sufficiently be found with a visible image, which is reproduced from an image signal detected with the ordinary sampling density. As another example, when the type "ordinary image recording mode, frontal kneepan" is selected during the image read-out operation, an image signal can be obtained with a sampling density which is suitable for making a diagnosis of an ordinary broken bone. However, in cases where a disease of a bone caused by lack of calcium is to be diagnosed, the problem occurs in that a diagnosis cannot be made accurately with a visible image, which is reproduced from the image signal obtained with the sampling density suitable for making a diagnosis of an ordinary broken bone.

It may be considered that, in order to cope with special diagnoses described above, every image signal be detected with a high sampling density. However, with such a technique, the amounts of image signals become very large, and therefore storage devices having a very large storage capacity must be used. Thus such a technique is not suitable from the point of view of the image filing efficiency.

SUMMARY OF THE INVENTION

The primary object of the present invention is to provide an image read-out apparatus which yields image signals suitable for reproduction of visible images to be used for special purposes, in particular, special diagnoses of illness, requiring information about details of an object, and which is suitable from the point of view of the image filing efficiency.

Another object of the present invention is to provide an image read-out apparatus which yields an image which has good image quality and can serve as an effective tool in, particularly, the efficient and accurate diagnosis of an illness.

The present invention provides a first image read-out apparatus comprising:

- i) a read-out section for scanning a recording medium, on which an image has been recorded, in a main scanning direction and a sub-scanning direction, and thereby generating an image signal which has been sampled with a predetermined sampling density from said image, and
- ii) an input section from which information about the type of said image and a high-density sampling instructing signal can be entered,
- wherein said read-out section is provided with a sampling density adjusting means, which adjusts said predetermined sampling density so that it becomes equal to a sampling density corresponding to said type in cases where only the information about the type has been entered from said input section, and which adjusts said predetermined sampling density so that it becomes equal to a high sampling density, which is higher than the sampling density corresponding to said type, in cases where said high-density sampling instructing signal has been entered from said input section.

The present invention also provides a second image read-out apparatus, wherein the first image readout apparatus in accordance with the present invention is further provided with:

- a) an image reproducing section for reproducing a visible image from an image signal,
- b) an image signal storing section for storing an image signal,
- c) a resampling section for receiving an image signal, which has been sampled with said high sampling density, carrying out resampling processing on the image signal, which has been sampled with said high sampling density, and thereby generating an image signal sampled with the sampling density corresponding to said type, and
- d) an image signal transmission control section for, in cases where said high-density sampling instructing signal has been entered from said input section, transmitting the image signal, which has been sampled with said high sampling density, to said image reproducing section, and transmitting the image signal, which has been generated by said resampling section and which has been sampled with the sampling density corresponding to said type, to said image signal storing section.

The present invention further provides a third image read-out apparatus comprising:

- i) a read-out section for scanning a recording medium, on which an image has been recorded, in a main scanning direction and a sub-scanning direction, and thereby generating an image signal which has been sampled with a predetermined sampling density from said image, and
- ii) an input section from which information about the size of said recording medium and a high-density sampling instructing signal can be entered,
- wherein said read-out section is provided with a sampling density adjusting means, which adjusts said predetermined sampling density so that it becomes equal to a sampling density corresponding to said size in cases where only the information about the size has been entered from said input section, and which adjusts said predetermined sampling density so that it becomes equal to a high sampling density, which is higher than the sampling density corresponding to said size, in cases where said high-density sampling instructing signal has been entered from said input section.

The present invention still further provides a fourth image read-out apparatus comprising:

- i) a read-out section for scanning a recording medium, on which an image has been recorded, in a main scanning direction and a sub-scanning direction, and thereby generating an image signal which has been sampled with a predetermined sampling density from said image,
- ii) an input section from which a high-density sampling instructing signal can be entered, and
- iii) a detection means for detecting the size of said recording medium,
- wherein said read-out section is provided with a sampling density adjusting means, which adjusts said predetermined sampling density so that it becomes equal to a sampling density corresponding to said size in cases where said high-density sampling instructing signal has not been entered, and which adjusts said predetermined sampling density so that it becomes equal to a high sampling density, which is higher than the sampling density corresponding to said size, in cases where said high-density sampling instructing signal has been entered from said input section.

The present invention also provides a fifth image read-out apparatus, wherein the third or fourth image read-out apparatus in accordance with the present invention is further provided with:

- a) an image reproducing section for reproducing a visible image from an image signal,
- b) an image signal storing section for storing an image signal,
- c) a resampling section for receiving an image signal, which has been sampled with said high sampling density, carrying out resampling processing on the image signal, which has been sampled with said high sampling density, and thereby generating an image signal sampled with the sampling density corresponding to said size, and
- d) an image signal transmission control section for, in cases where said high-density sampling instructing signal has been entered from said input section, transmitting the image signal, which has been sampled with said high sampling density, to said image reproducing section, and transmitting the image signal, which has been generated by said resampling section and which has been sampled with the sampling density corresponding to said size, to said image signal storing section.

The present invention further provides a sixth image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the type of said image, from said image, ii) an input section from which information about the type of said image can be entered, and iii) a resampling section for, in cases where the information about the type has been entered from said input section, receiving said image signal, carrying out resampling processing on said image signal, and thereby generating an image signal sampled with the predetermined sampling density corresponding to said type.

The present invention still further provides a seventh image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the size of said recording medium, from said image, ii) an input section from which information about the size of said recording medium can be entered, and iii) a resampling section for, in cases where the information about the size has been entered from said input section, receiving said image signal, carrying out resampling processing on said image signal, and thereby generating an image signal sampled with the predetermined sampling density corresponding to said size.

The present invention further provides an eighth image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the type of said image, from said image, ii) an input section from which information about the type of said image and a high-density sampling instructing signal can be entered, iii) a resampling section for, regardless of whether said high-density sampling instructing signal has been or has not been entered, receiving said image signal, which has been sampled with said high sampling density, carrying out resampling processing on said image signal, and thereby generating an image signal sampled with the predetermined sampling density corresponding to said type, iv) an image reproducing section for reproducing a visible image from an image signal, v) an image signal storing section for storing an image signal, and vi) an image signal transmission control section for:

in accordance with whether said high-density sampling instructing signal has been or has not been entered from said input section, transmitting the image signal, which has been sampled with said high sampling density, or the image signal, which has been generated by said resampling section and which has been sampled with the predetermined sampling density corresponding to said type, to said image reproducing section, and regardless of whether said high-density sampling instructing signal has been or has not been entered, transmitting the image signal, which has been generated by said resampling section and which has been sampled with the predetermined sampling density corresponding to said type, to said image signal storing section.

The present invention still further provides a ninth image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the size of said recording medium, from said image, ii) an input section from which information about the size of said recording medium and a high-density sampling instructing signal can be entered, iii) a resampling section for, regardless of whether said high-density sampling instructing signal has been or has not been entered, receiving said image signal, which has been sampled with said high sampling density, carrying out resampling processing on said image signal, and thereby generating an image signal sampled with the predetermined sampling density corresponding to said size, iv) an image reproducing section for reproducing a visible image from an image signal, v) an image signal storing section for storing an image signal, and vi) an image signal transmission control section for:

in accordance with whether said high-density sampling instructing signal has been or has not been entered from said input section, transmitting the image signal, which has been sampled with said high sampling density, or the image signal, which has been generated by said resampling section and which has been sampled with the predetermined sampling density corresponding to said size, to said image reproducing section, and regardless of whether said high-density sampling instructing signal has been or has not been entered, transmitting the image signal, which has been generated by said resampling section and which has been sampled with the predetermined sampling density corresponding to said size, to said image signal storing section.

The present invention also provides a tenth image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the size of said recording medium, from said image, ii) an input section from which a high-density sampling instructing signal can be entered, iii) a detection means for detecting the size of said recording medium, iv) a resampling section for, regardless of whether said high-density sampling instructing signal has been or has not been entered, receiving said image signal, which has been sampled with said high sampling density, carrying out resampling processing on said image signal, and thereby generating an image signal sampled with the predetermined sampling density corresponding to said size, v) an image reproducing section for reproducing a visible image from an image signal, vi) an image signal storing section for storing an image signal, and vii) an image signal transmission control section for:

in accordance with whether said high-density sampling instructing signal has been or has not been entered from said input section, transmitting the image signal, which has been sampled with said high sampling density, or the image signal, which has been generated by said resampling section and which has been sampled with the predetermined sampling density corresponding to said size, to said image reproducing section, and regardless of whether said high-density sampling instructing signal has been or has not been entered, transmitting the image signal, which has been generated by said resampling section and which has been sampled with the predetermined sampling density corresponding to said size, to said image signal storing section.

The term "type" as used herein for the first, second, sixth, and eighth image read-out apparatuses in accordance with the present invention means one of the types into which images are classified from the point of view of the sampling densities necessary for the images, or the like. No limitation is imposed on how images are classified into the types. By way of example, in the cases of systems for recording X-ray images for medical diagnosis, images are classified into types in accordance with what mode was used when the image was recorded (e.g., an ordinary image recording mode, an enlarged image recording mode, a reduced image recording mode, tomography, or contrasted image recording mode) and what portion of an object is represented by the recorded image (e.g., the frontal head, the frontal chest, or the side chest).

The term "information about the size of a recording medium" as used herein for the third, fourth, fifth, seventh, ninth, and tenth image read-out apparatuses in accordance with the present invention means the information, which directly represents the size, like "x cm × y cm", and the information about a number, a symbol, a name, or the like, corresponding to the size of the recording medium.

Also, the image reproducing section of the second, fifth, eighth, ninth, or tenth image read-out apparatus in accordance with the present invention may be constituted of a device, which generates a hard copy of an image, e.g. a laser printer, or a display device which displays an image, e.g. a CRT display device.

With the first image read-out apparatus in accordance with the present invention, the read-out section is provided with the sampling density adjusting means. In cases where only the information about the type of the image has been entered from the input section, the predetermined sampling density is adjusted so that it becomes equal to a sampling density corresponding to the type of the image. In cases where the high-density sampling instructing signal has been entered from the input section, the predetermined sampling density is adjusted so that it becomes equal to a high sampling density, which is higher than the sampling density corresponding to the type of the image. Therefore, when necessary, the high-density sampling instructing signal can be entered so that an image may be obtained from which details of an object can be found. During normal image read-out operations, an image signal can be obtained with a sampling density corresponding to the type of the image. In this manner, a visible image can be obtained which has good image quality and can serve as an effective tool in, particularly, the efficient and accurate diagnosis of an illness. Also, the image filing efficiency can be kept high.

With the second image read-out apparatus in accordance with the present invention, in cases where the high-density sampling instructing signal has been entered from the input section, the image signal, which has been sampled with the high sampling density, is transmitted to the image reproducing section. Also, the image signal, which has been generated by the resampling section and which has been sampled with the sampling density corresponding to the type of the image, is transmitted to the image signal storing section. Therefore, an image, from which details of an object can be found, can be reproduced in the image reproducing section. In most cases, after the image has been used during the finding of the details of the object, no problem will occur even if the image becomes slightly rough. Therefore, the image signal, which has been sampled with the sampling density employed in cases where no high-density sampling instructing signal is entered, is stored in the image signal storing section. Accordingly, the image filing efficiency can be kept high.

In general, when images are classified in accordance with the sampling densities necessary for the images, the size of the recording medium and the type of an image correspond to each other. Therefore, the term "type of an image" used for the first and second image read-out apparatuses in accordance with the present invention may be replaced by the term "size of a recording medium" on which the image was recorded.

With the third image read-out apparatus in accordance with the present invention, the input section, from which the information about the size of the recording medium can be entered, is provided in lieu of the input section of the first image read-out apparatus in accordance with the present invention from which the information about the type of the image can be entered. Therefore, as in the case of the first image read-out apparatus in accordance with the present invention, when necessary, the high-density sampling instructing signal can be entered so that an image may be obtained from which details of an object can be found. During normal image read-out operations, an image signal can be obtained with a sampling density corresponding to the size of the recording medium. In this manner, a visible image can be obtained which has good image quality and can serve as an effective tool in, particularly, the efficient and accurate diagnosis of an illness. Also, the image filing efficiency can be kept high.

With the fourth image read-out apparatus in accordance with the present invention, when necessary, only the high-density sampling instructing signal is entered from the input section. Also, instead of the information about the type of the image or the size of the recording medium being entered from the input section, the detection means is provided to detect the size of the recording medium. Therefore, the same effects as those of the third image read-out apparatus in accordance with the present invention can be obtained. Additionally, the information about the type of the image or the size of the recording medium need not be entered from the input section. Therefore, the operation for entering the information becomes easy, and errors in entering the information can be minimized. Thus the fourth image read-out apparatus in accordance with the present invention is easy to operate.

With the fifth image read-out apparatus in accordance with the present invention, like the second image read-out apparatus in accordance with the present invention, in cases where the high-density sampling instructing signal has been entered from the input section, the image signal, which has been sampled with the high sampling density, is transmitted to the image reproducing section. Also, the image signal, which has been generated by the resampling section and which has been sampled with the sampling density corresponding to the size of the recording medium, is transmitted to the image signal storing section. Therefore, an image, from which details of an object can be found, can be reproduced in the image reproducing section. In most cases, after the image has been used during the finding of the details of the object, no problem will occur even if the image becomes slightly rough. Therefore, the image signal, which has been sampled with the sampling density employed in cases where no high-density sampling instructing signal is entered, is stored in the image signal storing section. Accordingly, the image filing efficiency can be kept high.

With the sixth image read-out apparatus in accordance with the present invention, unlike the first to fifth image read-out apparatuses in accordance with the present invention, the image signal, which has been sampled with the high sampling density, is obtained in the read-out section. Also, the resampling section is provided. In cases where the information about the type of the image has been entered from the input section, the resampling section receives the image signal, carries out the resampling processing on the image signal, and thereby generates an image signal sampled with the predetermined sampling density corresponding to the type of the image. Therefore, as in the case of the first image read-out apparatus in accordance with the present invention, when necessary, an image can be obtained from which details of an object can be found. Also, when details of an object need not be found, an image signal can be obtained with a sampling density corresponding to the type of the image. In this manner, a visible image can be obtained which has good image quality and can serve as an effective tool in, particularly, the efficient and accurate diagnosis of an illness.

With the seventh image read-out apparatus in accordance with the present invention, the input section, from which the information about the size of the recording medium can be entered, is provided in lieu of the input section of the sixth image read-out apparatus in accordance with the present invention from which the information about the type of the image can be entered. Therefore, as in the case of the sixth image read-out apparatus in accordance with the present invention, when necessary, an image can be obtained from which details of an object can be found. Also, when details of an object need not be found, an image signal can be obtained with a sampling density corresponding to the size of the recording medium. In this manner, a visible image can be obtained which has good image quality and can serve as an effective tool in, particularly, the efficient and accurate diagnosis of an illness.

With the eighth image read-out apparatus in accordance with the present invention, like the sixth image read-out apparatus in accordance with the present invention, the image signal, which has been sampled with the high sampling density, is obtained in the read-out section. When the high-density sampling instructing signal has been entered from the input section, the image signal, which has been sampled with the high sampling density, is transmitted to the image reproducing section. Also, regardless of whether the high-density sampling instructing signal has been or has not been entered, the image signal, which has been generated by the resampling section and which has been sampled with the predetermined sampling density corresponding to the type of the image, is transmitted to the image signal storing section. Therefore, as in the case of the sixth image read-out apparatus in accordance with the present invention, an image, from which details of an object can be found, can be reproduced in the image reproducing section. Also, the image signal, which has been sampled with the sampling density employed in cases where no high-density sampling instructing signal is entered, is stored in the image signal storing section. Accordingly, the image filing efficiency can be kept high.

With the ninth image read-out apparatus in accordance with the present invention, the input section, from which the information about the size of the recording medium can be entered, is provided in lieu of the input section of the eighth image read-out apparatus in accordance with the present invention from which the information about the type of the image can be entered. Therefore, as in the case of the eighth image read-out apparatus in accordance with the present invention, an image, from which details of an object can be found, can be reproduced in the image reproducing section. Also, the image signal, which has been sampled with the sampling density employed in cases where no high-density sampling instructing signal is entered, is stored in the image signal storing section. Accordingly, the image filing efficiency can be kept high.

With the tenth image read-out apparatus in accordance with the present invention, when necessary, only the high-density sampling instructing signal is entered from the input section. Also, instead of the information about the type of the image or the size of the recording medium being entered from the input section, the detection means is provided to detect the size of the recording medium. Therefore, the same effects as those of the ninth image read-out apparatus in accordance with the present invention can be obtained. Additionally, the information about the type of the image or the size of the recording medium need not be entered from the input section. Therefore, the operation for entering the information becomes easy, and errors in entering the information can be minimized. Thus the tenth image read-out apparatus in accordance with the present invention is easy to operate.

DESCRIPTION OF THE PREFERRED EMBODIMENTS

The present invention will hereinbelow be described in further detail with reference to the accompanying drawing.

By way of example, in the embodiments described below, a stimulable phosphor sheet is used.

Figure 2:
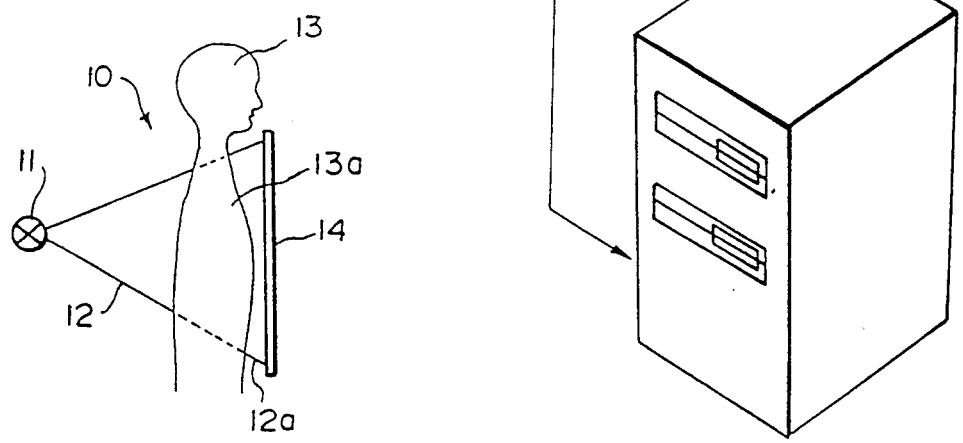
FIG. 2 is a schematic view showing an example of an X-ray image recording apparatus.

FIG. 2 is a schematic view showing an example of an X-ray image recording apparatus.

With reference to FIG. 2, X-rays 12 are produced by an X-ray source 11 of an X-ray image recording apparatus 10. The X-rays 12 pass through the chest 13a of a human body (object) 13. The X-rays 12a, which have passed through the human body 13, impinge upon a stimulable phosphor sheet 14. In this manner, an X-ray image of the chest 13a of the human body 13 is stored on the stimulable phosphor sheet 14.

Figure 1:
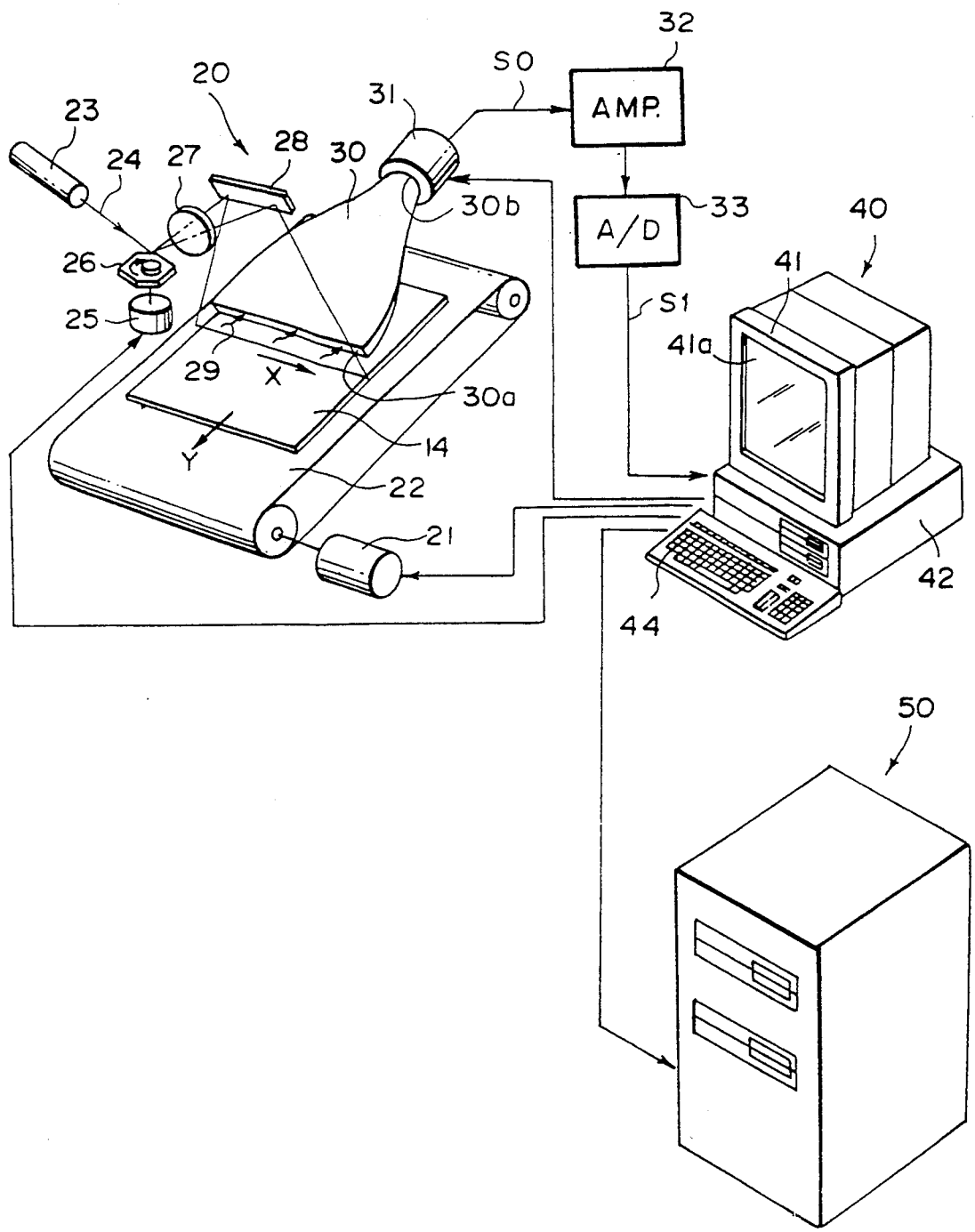
FIG. 1 is a perspective view showing an embodiment of the image read-out apparatus in accordance with the present invention, which is constituted as an X-ray image read-out apparatus.

FIG. 1 is a perspective view showing an embodiment of the image read-out apparatus in accordance with the present invention, which is constituted as an X-ray image read-out apparatus.

With reference to FIG. 1, a stimulable phosphor sheet 14, on which an X-ray image has been stored in the X-ray image recording apparatus of FIG. 2, is placed at a predetermined position in a read-out section 20.

Also, information about the mode, which was used when the X-ray image was recorded in the X-ray image recording apparatus, and the portion of the object, which is represented by the X-ray image, is entered from a keyboard 44 of a computer system 40. The keyboard 44 constitutes an example of the input section of the image read-out apparatus in accordance with the present invention. A high-density sampling instructing signal can also be entered from the keyboard 44.

When the information about the mode, which was used when the X-ray image was recorded in the X-ray image recording apparatus, and the portion of the object, which is represented by the X-ray image, is entered from a keyboard 44, the speed, with which a motor 25 for rotating a rotating polygon mirror 26 is rotated, and the speed, with which a motor 21 for conveying an endless belt 22, are adjusted. In this manner, the main scanning speed and the sub-scanning speed, which determine the sampling density, are adjusted. Also, in accordance with the adjustment of the sampling density, a voltage applied to a photomultiplier 31 is adjusted such that an analog signal S0 having an appropriate level may be obtained. In cases where the high-density sampling instructing signal is entered from the keyboard 44, the sampling density and the voltage applied to the photomultiplier 31 are adjusted such that the sampling may be carried out with a predetermined high sampling density regardless of the mode, which was used when the X-ray image was recorded in the X-ray image recording apparatus, and the portion of the object, which is represented by the X-ray image.

After the stimulable phosphor sheet 14 has been set at the predetermined position in the read-out section 20 and the necessary information has been entered from the keyboard 44, the stimulable phosphor sheet 14 is conveyed in a sub-scanning direction indicated by the arrow Y by the endless belt 22, which is operated by the motor 21. A laser beam 24, which serves as stimulating rays, is produced by a laser beam source 23, and is reflected and deflected by the rotating polygon mirror 26 which is quickly rotated by the motor 25 in the direction indicated by the arrow. The laser beam 24 then passes through a converging lens 27 constituted of an $f\theta$ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by the photomultiplier 31. The light guide member 30 is made from a light guiding material such as an acrylic plate and has a linear light input face 30a, positioned so that it extends along the main scanning line on the stimulable phosphor sheet 14, and a ring-shaped light output face 30b, positioned so that it is in in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33 into an electric image signal S1.

Regardless of whether the high-density sampling instructing signal has been or has not been entered from the keyboard 44, the image signal S1 is fed into a CRT display device 41. A visible image is reproduced from the image signal S1 and displayed on a display screen 41a of the CRT display device 41. The CRT display device 41 has a high resolution so that an image reproduced from an image signal, which has been sampled with a high sampling density when the high-density sampling instructing signal has been entered from the keyboard 44, may be displayed.

In cases where the image signal S1 is the one, which has been sampled with a high sampling density when the high-density sampling instructing signal has been entered from the keyboard 44, a CPU incorporated in a main body 42 of the computer system 40 carries out resampling processing on the image signal S1 and converts it into an image signal, which has been sampled with the sampling density employed when no high-density sampling instructing signal has been entered from the keyboard 44. The resampling processing may be carried out with one of various interpolating operations, or the like. The combination of the hardware function and the software function for carrying out the resampling processing in the main body 42 constitutes an example of the resampling section of the image read-out apparatus in accordance with the present invention.

The image signal, which has been obtained from the resampling processing in cases where the high-density sampling instructing signal has been entered from the keyboard 44, or the image signal S1, which has been obtained in cases where no high-density sampling instructing signal has been entered, is fed into an optical disk drive unit 50 and stored on an optical disk. The optical disk drive unit 50 constitutes an example of the image signal storing section of the image read-out apparatus in accordance with the present invention.

In the manner described above, in cases where the high-density sampling instructing signal has been entered from the keyboard 44, a visible image is reproduced from the image signal, which has been sampled with the high sampling density. The visible image is displayed on the CRT display device 41. In most cases, after the image has been used during the finding of details of the object, no problem will occur even if the image becomes slightly rough. Therefore, the image signal, which has been obtained from the resampling processing, is stored on the optical disk. Accordingly, the image filing efficiency can be kept high.

In the embodiment described above, the image is displayed on the CRT display device 41. Alternatively, a laser printer, or the like, may be used, and a hard copy of the visible image represented by the image signal S1 may be formed. In such cases, a hard copy of the visible image represented by the image signal, which has been sampled with the high sampling density in accordance with the high-density sampling instructing signal, is obtained. Therefore, occasions, on which image signals representing slightly rough images may be stored, increase as compared with the cases where visible images are displayed on the CRT display device.

In cases where the high-density sampling instructing signal has been entered from the keyboard 44, the resampling processing may not be carried out, but the image signal, which has been sampled with the high sampling density, may be directly transmitted to the optical disk drive unit 50 and stored on the optical disk. In such cases, the image filing efficiency becomes slightly low, depending on how often the high-density sampling is designated. However, in such cases, images from which details of the object can be found can be reproduced at any time.

In the aforesaid embodiment, the read-out section 20 is provided with the sampling density adjusting means. However, the read-out section 20 need not necessarily be provided with the sampling density adjusting means. In cases where the read-out section 20 is not provided with the sampling density adjusting means, the sampling density in the read-out section is fixed at the high sampling density. By carrying out the resampling processing in the main body 42, an image signal is obtained which has been sampled with the sampling density corresponding to the mode, which was used when the X-ray image was recorded in the X-ray image recording apparatus, and the portion of the object, which is represented by the X-ray image. Also, in such cases, when the high-density sampling instructing signal has been entered from the keyboard 44, the image signal, which has not been subjected to the resampling processing, is fed into the CRT display device 41, and the image signal, which has been obtained from the resampling processing, is fed into the optical disk drive unit 50. As in the aforesaid embodiment, in cases where the high-density sampling instructing signal has been entered from the keyboard 44, the image signal, which has not been subjected to the resampling processing, may be fed into the optical disk drive unit 50. In such cases, when no information about the mode, which was used when the X-ray image was recorded in the X-ray image recording apparatus, and the portion of the object, which is represented by the X-ray image, is entered from the keyboard 44, it may be regarded that the high-density sampling has been designated.

In the embodiments described above, the information about the mode, which was used when the X-ray image was recorded in the X-ray image recording apparatus, and the portion of the object, which is represented by the X-ray image, is entered as an example of the information about the type of the image from the keyboard 44. When images are classified from the point of view of the required sampling density, determining the sampling density in accordance with the mode, which was used when the X-ray image was recorded in the X-ray image recording apparatus, and the portion of the object, which is represented by the X-ray image, is equivalent to determining the sampling density in accordance with the size of the stimulable phosphor sheet 14. Therefore, in the aforesaid embodiments, instead of the information about the recording mode and the portion of the object being entered from the keyboard 44, the information about the size of the stimulable phosphor sheet 14 may be entered from the keyboard 44.

Also, instead of the information about the size of the stimulable phosphor sheet 14 being entered from the keyboard 44, the size of the stimulable phosphor sheet 14 may be measured during the image read-out operation.

Figure 3:
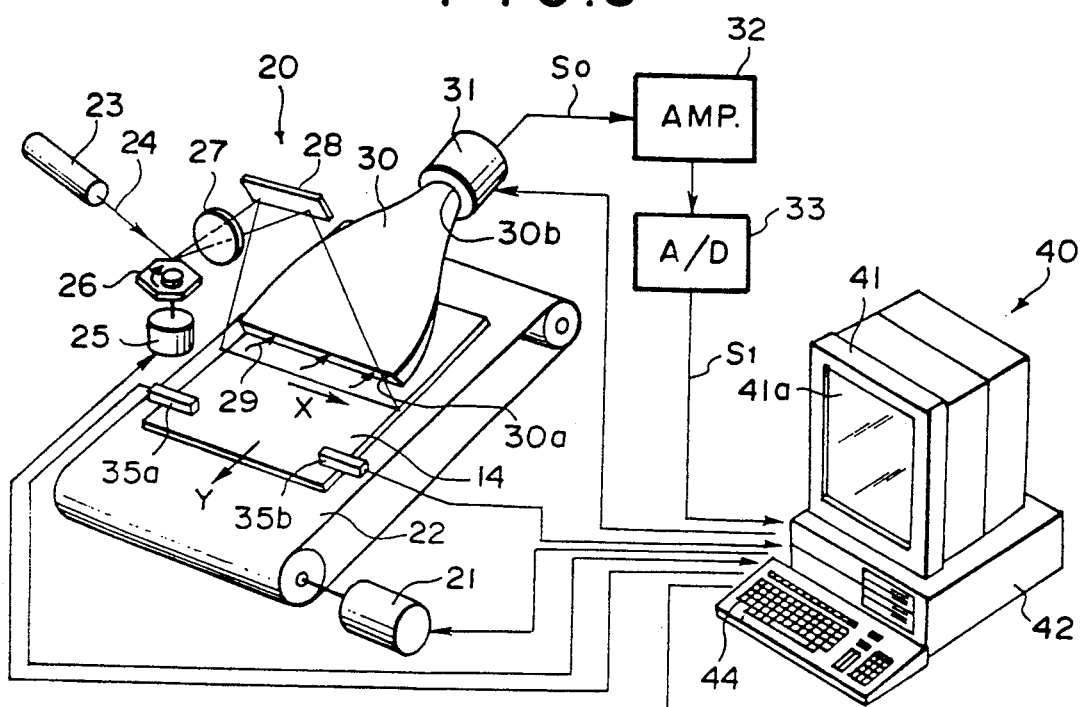
FIG. 3 is a perspective view showing another embodiment of the image read-out apparatus in accordance with the present invention, which is constituted as an X-ray image read-out apparatus.

FIG. 3 shows an embodiment of the image readout apparatus in accordance with the present invention, which is constituted as an X-ray image read-out apparatus and in which the size of the stimulable phosphor sheet 14 is measured. In FIG. 3, similar elements are numbered with the same reference numerals with respect to FIG. 1.

In the embodiment of FIG. 3, sensor arrays 35a and 35b measure the width of the stimulable phosphor sheet 14 when the stimulable phosphor sheet 14 is being moved in the direction indicated by the arrow Y. The width of the stimulable phosphor sheet 14 is found in accordance with which sensors (not shown) of each of the sensor arrays 35a and 35b have detected the stimulable phosphor sheet 14. Information about the measured size is fed into the computer system 40. In this embodiment, stimulable phosphor sheets having several sizes are used. The ratios of the lengths of the stimulable phosphor sheets to the widths thereof are constant. Therefore, the size of the stimulable phosphor sheet 14 can be found only by measuring its width. The information about the size of the stimulable phosphor sheet 14, which has been fed into the computer system 40, is used during the adjustment of the sampling density, which adjustment is made in the same manner as that in the aforesaid embodiments.

The embodiments described above are constituted as the X-ray image read-out apparatuses for reading out the X-ray image from the stimulable phosphor sheet. The image read-out apparatus in accordance with the present invention is broadly applicable when image signals are detected from various kinds of recording media, on which images have been recorded, e.g. when an X-ray image is read out from X-ray film.

I claim:

1. An image read-out apparatus comprising:
   i) a read-out section for scanning a recording medium, on which an image has been recorded, in a main scanning direction and a sub-scanning direction, and thereby generating an image signal which has been sampled with a predetermined sampling density from said image, and ii) an input section from which information about the type of said image and a high-density sampling instructing signal are entered, wherein said read-out section is provided with a sampling density adjusting means, which adjusts said predetermined sampling density so that said predetermined sampling density becomes equal to a sampling density corresponding to said type in cases where only the information about the type has been entered from said input section, and which adjusts said predetermined sampling density so that said predetermined sampling density becomes equal to a high sampling density, which is higher than the sampling density corresponding to said type, in cases where said high-density sampling instructing signal has been entered from said input section.

2. An apparatus as defined in claim 1 further comprising:
a) an image reproducing section for reproducing a visible image from said image signal,
b) said image signal storing section for storing said image signal,
c) a resampling section for receiving an original image signal, which has been sampled with said high sampling density, carrying out resampling processing on said original image signal, which has been sampled with said high sampling density, and thereby generating a processed image signal sampled with the sampling density corresponding to said type, and
d) an image signal transmission control section for, in cases where said high-density sampling instructing signal has been entered from said input section, transmitting said original image signal, which has been sampled with said high sampling density, to said image reproducing section, and transmitting said processed image signal, which has been generated by said resampling section and which has been sampled with the sampling density corresponding to said type, to said image signal storing section.

3. An apparatus as defined in claim 1 wherein said recording medium is a stimulable phosphor sheet on which a radiation image has been stored.

4. An apparatus as defined in claim 3 wherein said read-out section generates said image signal representing said radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

5. An apparatus as defined in claim 4 wherein said stimulating rays are a laser beam.

6. An apparatus as defined in claim 1 wherein said recording medium is photographic film.

7. An image read-out apparatus comprising:
i) a read-out section for scanning a recording medium, on which an image has been recorded, in a main scanning direction and a sub-scanning direction, and thereby generating an image signal which has been sampled with a predetermined sampling density from said image, and
ii) an input section from which information about the size of said recording medium and a high-density sampling instructing signal are entered, wherein said read-out section is provided with a sampling density adjusting means, which adjusts said predetermined sampling density so that said predetermined sampling density becomes equal to a sampling density corresponding to said size in cases where only the information about the size has been entered from said input section, and which adjusts said predetermined sampling density so that said predetermined sampling density becomes equal to a high sampling density, which is higher than the sampling density corresponding to said size, in cases where said high-density sampling instructing signal has been entered from said input section.

8. An apparatus as defined in claim 7 further comprising:
a) an image reproducing section for reproducing a visible image from said image signal,
b) an image signal storing section for storing said image signal,
c) a resampling section for receiving an original image signal, which has been sampled with said high sampling density, carrying out resampling processing on said original image signal, which has been sampled with said high sampling density, and thereby generating a processed image signal sampled with the sampling density corresponding to said size, and
d) an image signal transmission control section for, in cases where said high-density sampling instructing signal has been entered from said input section, transmitting said image signal, which has been sampled with said high sampling density, to said image reproducing section, and transmitting said original image signal, which has been generated by said resampling section and which has been sampled with the sampling density corresponding to said size, to said image signal storing section.

9. An apparatus as defined in claim 7 wherein said recording medium is a stimulable phosphor sheet on which a radiation image has been stored.

10. An apparatus as defined in claim 9 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

11. An apparatus as defined in claim 10 wherein said stimulating rays are a laser beam.

12. An apparatus as defined in claim 7 wherein said recording medium is photographic film.

13. An image read-out apparatus comprising:
i) a read-out section for scanning a recording medium, on which an image has been recorded, in a main scanning direction and a sub-scanning direction, and thereby generating an image signal which has been sampled with a predetermined sampling density from said image,
ii) an input section from which a high-density sampling instructing signal are entered, and
iii) a detection means for detecting the size of said recording medium, wherein said read-out section is provided with a sampling density adjusting means, which adjusts said predetermined sampling density so that said predetermined sampling density becomes equal to a sampling density corresponding to said size in cases where said high-density sampling instructing signal has not been entered, and which adjusts said predetermined sampling density so that said predetermined sampling density becomes equal to a high sampling density, which is higher than the sampling density corresponding to said size, in cases where said high-density sampling instructing signal has been entered from said input section.

14. An apparatus as defined in claim 13 further comprising:
   a) an image reproducing section for reproducing a visible image from said image signal,
   b) an image signal storing section for storing said image signal,
   c) a resampling section for receiving an original image signal, which has been sampled with said high sampling density, carrying out resampling processing on said original image signal, which has been sampled with said high sampling density, and thereby generating a processed image signal sampled with the sampling density corresponding to said size, and
   d) an image signal transmission control section for, in cases where said high-density sampling instructing signal has been entered from said input section, transmitting said original image signal, which has been sampled with said high sampling density, to said image reproducing section, and transmitting said processed image signal, which has been generated by said resampling section and which has been sampled with the sampling density corresponding to said size, to said image signal storing section.

15. An apparatus as defined in claim 13 wherein said recording medium is a stimulable phosphor sheet on which a radiation image has been stored.

16. An apparatus as defined in claim 15 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

17. An apparatus as defined in claim 16 wherein said stimulating rays are a laser beam.

18. An apparatus as defined in claim 13 wherein said recording medium is photographic film.

19. An image read-out apparatus comprising:
   i) a read-out section for scanning a recording medium, on which an image has been recorded, in a main scanning direction and a sub-scanning direction, and thereby generating an original image signal which has been sampled with a high sampling density, which is higher than a predetermined sampling density corresponding to the type of said image, from said image,
   ii) an input section from which information about the type of said image are entered, and
   iii) a resampling section for, in cases where the information about the type has been entered from said input section, receiving said original image signal, carrying out resampling processing on said original image signal, and thereby generating a processed image signal sampled with the predetermined sampling density corresponding to said type.

20. An apparatus as defined in claim 19 wherein said recording medium is a stimulable phosphor sheet on which a radiation image has been stored.

21. An apparatus as defined in claim 20 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

22. An apparatus as defined in claim 21 wherein said stimulating rays are a laser beam.

23. An apparatus as defined in claim 19 wherein said recording medium is photographic film.

24. An image read-out apparatus comprising:
   i) a read-out section for scanning a recording medium, on which an original image has been recorded, in a main scanning direction and a sub-scanning direction, and thereby generating an original image signal which has been sampled with a high sampling density, which is higher than a predetermined sampling density corresponding to the size of said recording medium, from said image,
   ii) an input section from which information about the size of said recording medium are entered, and
   iii) a resampling section for, in cases where the information about the size has been entered from said input section, receiving said original image signal, carrying out resampling processing on said original image signal, and thereby generating a processed image signal sampled with the predetermined sampling density corresponding to said size.

25. An apparatus as defined in claim 24 wherein said recording medium is a stimulable phosphor sheet on which a radiation image has been stored.

26. An apparatus as defined in claim 25 wherein said read-out section generates said image signal representing a radiation image from a read-out operation wherein said stimulable phosphor sheet is exposed to stimulating rays, which cause said stimulable phosphor sheet to emit light in proportion to the amount of energy stored thereon during exposure to radiation, and the emitted light is detected photoelectrically.

27. An apparatus as defined in claim 26 wherein said stimulating rays are a laser beam.

28. An apparatus as defined in claim 24 wherein said recording medium is photographic film.

29. An image read-out apparatus comprising:
   i) a read-out section for scanning a recording medium, on which an image has been recorded, in a main scanning direction and a sub-scanning direction, and thereby generating an original image signal which has been sampled with a high sampling density, which is higher than a predetermined sampling density corresponding to the type of said image, from said image,
   ii) an input section from which information about the type of said image and a high-density sampling instructing signal are entered,
   iii) a resampling section for, regardless of whether said high-density sampling instructing signal has been or has not been entered, receiving said original image signal, which has been sampled with said high density, carrying out resampling processing on said original image signal, and thereby generating a processed image signal sampled with the predetermined sampling density corresponding to said type,
   iv) an image reproducing section for reproducing a visible image from said image signal, v) an image signal storing section for storing said image signal, and vi) an image signal transmission control section for:

in accordance with whether said high-density sampling instructing signal has been or has not been entered from said input section, transmitting said original image signal, which has been sampled with said high sampling density, or said processed image signal, which has been generated by said resampling section and which has been sampled with the predetermined sampling density corresponding to said type, to said image reproducing section, and regardless of whether said high-density sampling instructing signal has been or has not been entered, transmitting said processed image signal, which has been generated by said resampling section and which has been sampled with the predetermined sampling density corresponding to said type, to said image signal storing section.

30. An apparatus as defined in claim 29 wherein said recording medium is a stimulable phosphor sheet on which a radiation image has been stored.

31. An apparatus as defined in claim 30 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

32. An apparatus as defined in claim 31 wherein said stimulating rays are a laser beam.

33. An apparatus as defined in claim 29 wherein said recording medium is photographic film.

34. An image read-out apparatus comprising:

i) a read-out section for scanning a recording medium, on which an image has been recorded, in a main scanning direction and a sub-scanning direction, and thereby generating an original image signal which has been sampled with a high sampling density, which is higher than a predetermined sampling density corresponding to the size of said recording medium, from said image, an input section from which information about the size of said recording medium and a high-density sampling instructing signal are entered, iii) a resampling section for, regardless of whether said high-density sampling instructing signal has been or has not been entered, receiving said original image signal, which has been sampled with said high sampling density, carrying out resampling processing on said original image signal, and thereby generating a processed image signal sampled with the predetermined sampling density corresponding to said size, iv) an image reproducing section for reproducing a visible image from said processed image signal, v) an image signal storing section for storing said processed image signal, and vi) an image signal transmission control section for:

in accordance with whether said high-density sampling instructing signal has been or has not been entered from said input section, transmitting said original image signal, which has been sampled with said high sampling density, or said processed image signal, which has been generated by said resampling section and which has been sampled with the predetermined sampling density corresponding to said size, to said image reproducing section, and regardless of whether said high-density sampling instructing signal has been or has not been entered, transmitting said processed image signal, which has been generated by said resampling section and which has been sampled with the predetermined sampling density corresponding to said size, to said image signal storing section.

35. An apparatus as defined in claim 34 wherein said recording medium is a stimulable phosphor sheet on which a radiation image has been stored.

36. An apparatus as defined in claim 35 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

37. An apparatus as defined in claim 36 wherein said stimulating rays are a laser beam.

38. An apparatus as defined in claim 34 wherein said recording medium is photographic film.

39. An image read-out apparatus comprising:

i) a read-out section for scanning a recording medium, on which an image has been recorded, in a main scanning direction and a sub-scanning direction, and thereby generating an image signal which has been sampled with a high sampling density, which is higher than a predetermined sampling density corresponding to the size of said recording medium, from said image, ii) an input section from which a high-density sampling instructing signal are entered, iii) a detection means for detecting the size of said recording medium, iv) a resampling section for, regardless of whether said high-density sampling instructing signal has been or has not been entered, receiving said image signal, which has been sampled with said high sampling density, carrying out resampling processing on said image signal, and thereby generating an image signal sampled with the predetermined sampling density corresponding to said size, v) an image reproducing section for reproducing a visible image from an image signal, vi) an image signal storing section for storing an image signal, and vii) an image signal transmission control section for:

in accordance with whether said high-density sampling instructing signal has been or has not been entered from said input section, transmitting the image signal, which has been sampled with said high sampling density, or the image signal, which has been generated by said resampling section and which has been sampled with the predetermined sampling density corresponding to said size, to said image reproducing section, and regardless of whether said high-density sampling instructing signal has been or has not been entered, transmitting the image signal, which has been generated by said resampling section and which has been sampled with the predetermined sampling density corresponding to said size, to said image signal storing section.

40. An apparatus as defined in claim 39 wherein said recording medium is a stimulable phosphor sheet on which a radiation image has been stored.

41. An apparatus as defined in claim 40 wherein said read-out section generates said image signal representing a radiation image from a read-out operation wherein said stimulable phosphor sheet is exposed to stimulating rays, which cause said stimulable phosphor sheet to emit light in proportion to an amount of energy stored thereon during exposure to radiation, and the emitted light is detected photoelectrically.

42. An apparatus as defined in claim 41 wherein said stimulating rays are a laser beam.

43. An apparatus as defined in claim 39, wherein said recording medium is photographic film.

* * * * *